Feb. 18, 1969 S. S. ORKIN ET AL 3,428,374
SELF-LUBRICATING BEARING
Filed April 13, 1966

*INVENTOR.*
STANLEY S. ORKIN
VINCENT J. HUDACKO
BY
McCormick, Paulding & Huber
*ATTORNEYS.*

United States Patent Office 3,428,374
Patented Feb. 18, 1969

3,428,374
SELF-LUBRICATING BEARING
Stanley S. Orkin, Rockville, and Vincent J. Hudacko, Weatogue, Conn., assignors to Kaman Corporation, Bloomfield, Conn., a corporation of Connecticut
Filed Apr. 13, 1966, Ser. No. 542,417
U.S. Cl. 308—37                                    9 Claims
Int. Cl. F16c 17/04, 19/04, 9/06

ABSTRACT OF THE DISCLOSURE

A self-lubricated bearing assembly made of two bearing members having coengaging surfaces which are movable relative to each other. One of the bearing members is a ceramic material of a composition consisting essentially of at least 99% by weight polycrystalline aluminum oxide having an average grain size of 45 microns or finer and a density of at least 3.80 grams per cubic centimeter. The other bearing member is carbon which preferably is impregnated with silver.

---

Figure 2:
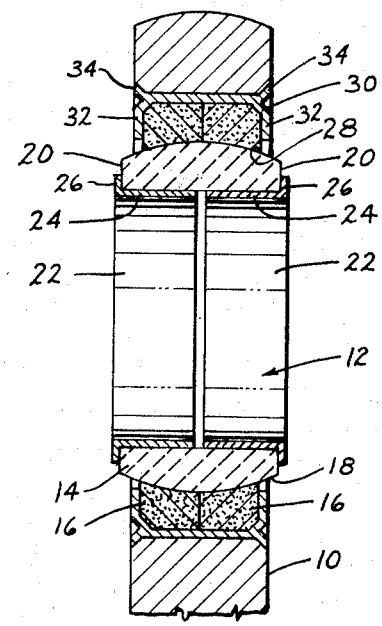

This invention relates to bearings, and deals more particularly with a bearing requiring no lubrication between its rubbing surfaces.

The general object of this invention is to provide a bearing of simple construction capable of operating without lubrication at a low wear rate so as to have a prolonged service life. In keeping with this general object, a further object of this invention is to provide a bearing which is useful in situations where it is difficult to maintain a lubricant in place (as in parts subjected to high centrifugal forces), where the environment is detrimental to normal lubricants, where lubricants present a contamination problem, or which the bearing is relatively inaccessible.

Another object of this invention is to provide a bearing of the foregoing character capable of handling high loads and high velocities over a wide range of temperatures.

Another object of the invention is to provide a bearing utilizing two relatively movable members made of a novel combination of materials, which bearing may be made in a variety of different forms and which in addition to requiring no lubricant has a high pressure-velocity rating, a low wear rate, a low static radial load displacement, a low starting torque, chemical stability, corrosion inertness, high temperature resistance, and requires no initial wear-in phase.

A more particular object of the invention is to provide a spherical bearing of the foregoing character expecially well suited to handling oscillating movement between two parts connected to one another by the bearing, as for example in a joint comprised of a rod end containing the bearing.

Other objects and advantages of the invention will be apparent from the following description and from the drawing forming a part hereof.

The drawing shows preferred embodiments of the invention and such embodiments will be described, but it will be understood that various changes may be made for the constructions disclosed, and that the drawing and description are not to be construed as defining or limiting the scope of the invention, the claims forming a part of this specification being relied upon for that purpose.

Figure 1:
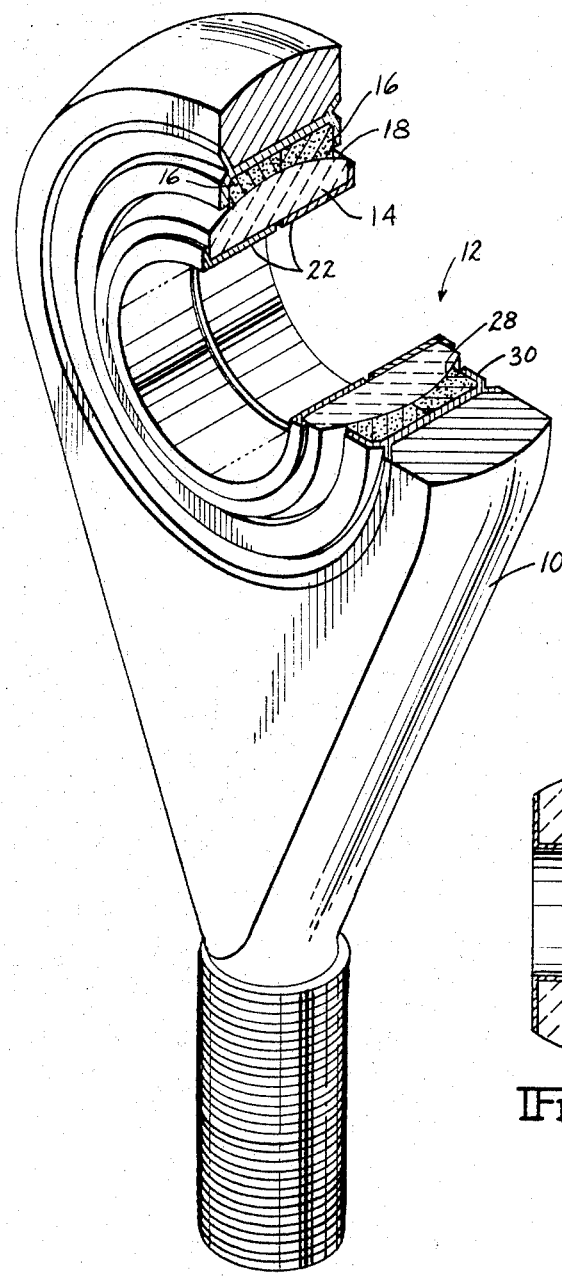

Of the drawings:
FIG. 1 is a perspective view of a rod end containing a bearing embodying the present invention, parts of the rod end being broken away to reveal more clearly the structure of the bearing.

Figure 3:
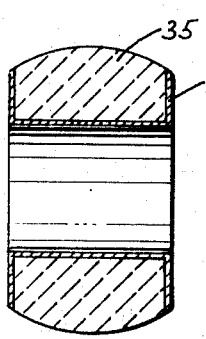
Figure 4:
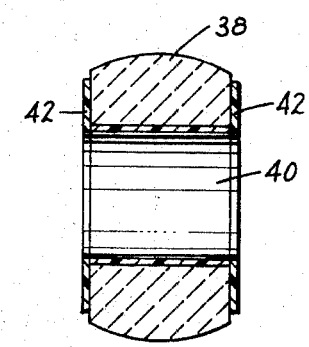

FIG. 2 is a vertical sectional view taken through the rod end of FIG. 1.
FIG. 3 is a vertical sectional view of the inner member of a bearing comprising an alternative embodiment of the invention.
FIG. 4 is a vertical sectional view of the inner member of a bearing comprising still another embodiment of this invention.

The bearing of this invention is of the type commonly referred to broadly as a plain bearing, it comprising two bearing members having coengaging surfaces which slide rather than roll relative to one another. In the bearing of the invention one of these bearing members is made from a ceramic material and the other is a body made at least in part of a carbonaceous material. This latter body may, for example, comprise solely a compacted mixture of carbon and graphite or may comprise a compacted mixture of carbon and graphite impregnated with a metal. The combination of the ceramic member with the carbonaceous member results in a dry bearing utilizing the inherent lubricity of the carbonaceous member and requiring no additional lubricant. The broad idea of a plain bearing comprised of a ceramic member and a carbonaceous member is old in the art. Bearings involving various different combinations of bearing materials and various different shapes, constructions, and assemblies of the bearing members have been previously proposed, and some of these bearings have been successfully used in specific applications. The present invention is concerned with improvements in such bearings and among other things involves the discovery of a combination of bearing materials providing highly superior results and the construction of the bearing in such a manner as to eliminate or reduce the possibility of cracking the ceramic member, particularly as a result of concentrated loads applied to its edges. A bearing utilizing the novel combination of bearing materials may be made in various different forms such as spherical bearings, journal bearings or thrust bearings. However, it has been found that the combination is particularly useful in connection with spherical bearings wherein the inner bearing or ball member, which is made of the ceramic material, carries little or no tensile or shear loads as might be encountered in a misaligned journal bearing.

As to the materials used for the bearing members, the ceramic member according to one aspect of this invention is a body of polycrystalline aluminum oxide which, in comparison to more conventional aluminum oxide bodies, is relatively pure aluminum oxide, is relatively nonporous or dense, and has a controlled small grain size. Exemplary processes for making bodies of this material are described in U.S. Patents Nos. 3,026,210 and 3,026,117. The material may be opaque but often is able to transmit radiant energy to some degree in which case it has a translucent appearance. More particularly, the material used has a specific gravity of at least 3.80 grams per cubic centimeter, and preferably greater than 3.82 grams per cubic centimeter; consists of at least 99% pure aluminum oxide; and in microstructure is polycrystalline with an average grain size of 45 microns or finer as determined by ASTM standard E-112-63. This material has a hardness rating equivalent to Mohs 9 and has a high compressive strength on the order of 300,000 p.s.i. In addition, a very fine finish of better than 3 RMS may be produced on the surface of the material by lapping. The bearing surface produced by this material is therefore much like that produced by a jewel, at least in appearance and finish, but unlike a jewel the material is polycrystalline in structure, rather than unicrystalline, and due to the small grain size the hardness, wear resistance and other properties of body are almost perfectly isotropic whereas in a single crystal body they are anisotropic. In addition, this material is chemically inert and has a low electrical potential to carbon so as to minimize any deterioration due to chemical or electrical reactions. The other bearing member is comprised of a body made almost entirely of a compacted blend of amorphous carbon and graphite or of such a body impregnated with a metal or other material to add additional strength to the body. A preferred material for this member is a compacted blend of carbon and graphite impregnated with silver.

In the accompanying drawing the ceramic member is shown as a body which is made completely from the ceramic material and to which liners or other auxiliary parts may be added. It should be understood, however, that the ceramic member may also be formed in many other ways without departing from the invention, as by forming a layer of the ceramic material by plasma coating or the like directly onto a metal liner, shaft, ball or other suitable substratum.

In addition to a novel combination of bearing materials the invention, as mentioned above, also involves the construction of the bearing to reduce the possibility of damage to the ceramic member by concentrated loads and edge induced weaknesses. Turning to the drawing, FIGS. 1 and 2 show, by way of example, a rod end containing a bearing incorporating the structural features of this invention. The rod end is comprised of an externally threaded banjo 10 having a transverse bore which receives the bearing, indicated generally at 12. The two coengaging and relatively slidable members of the bearing consist of an inner ball member 14 and an outer member comprised of two separate annular bodies 16, 16. The inner member 14 is the ceramic member and as mentioned is preferably a body of polycrystalline aluminum oxide, it being annular in shape and having a spherical external bearing surface 18 which is lapped to an extremely smooth finish. A bore extends through the member 14 and at each end of the bore is an end face 20, 20 which is arranged generally perpendicular to the axis of the bore, the end faces 20, 20 and the bore therefore forming an annular corner at each end of the bore.

In use, the threaded portion of the banjo 10 is threadably connected with one mechanism part and another mechanism part is connected to the inner bearing member 14 by a connecting member inserted through its bore. In order to prevent damage or cracking by the member inserted in its bore, the inner member 14 is provided with a lining means for shielding or protecting it in the vicinity of its annular corners and for preventing the application thereto of high concentrated loads, the lining means being interposed between the inserted connecting member and the inner member 14 and being softer than the material of the member 14 so as to deform slightly under load to distribute the load over a greater area of the inner member bore. This lining means may take various different forms and in the embodiment of FIGS. 1 and 2 comprises two inserts 22, 22 received in opposite end portions of the inner member. Each insert 22 includes an axially extending sleeve portion 24 located adjacent and lining the surface of the bore and, at its outer end, an integral radially extending flange portion 26 located adjacent the associated end face 20. The two inserts may be made of metal, such as stainless steel, and preferably are of such axial lengths so as to be separated at their inner ends by a small axial gap 28. Due to the presence of the gap 28, the inserts may be held in place, in use, by a compressive force exerted on the radial flanges 26, 26, as by retaining nuts located on opposite sides of the inner member 14, and passing through the member 14. The member 14 is thereby firmly clamped between the radial flanges of the inserts and the requirement for a very strong bond between the inserts and the ceramic member is eliminated. Because of the danger of cracking the member 14, the inserts may not be press-fitted in place and are instead made of a very slightly smaller external diameter than the diameter of the bore and are bonded in place by a suitable adhesive or other bonding agent. When the gap 28 is provided the bond need only be strong enough to retain the inserts in place when the bearing is out of service and disconnected from other elements.

The outer bearing member of the bearing 12, made up of the two annular blocks 16, 16 includes an internal spherical bearing surface 28. The two rings 16, 16 are comprised at least in part of a carbonaceous material and, as mentioned, are preferably comprised of a blend of amorphous carbon and graphite compacted and impregnated with silver. These two rings 16, 16 are held in place by a retainer 30 having two radially inwardly directed flanges 32, 32 engaging opposite side surfaces of the rings and having two other flanges 34, 34 which are swaged radially outwardly against inclined annular seating surfaces on the banjo 10 to hold the retainer in the banjo. Through the coengaging spherical bearing surfaces 18 and 28 the inner member 14 is in turn retained in place by the annular outer rings 16, 16 and is free to move in a universal manner relative to such outer members. In this type of bearing it is therefore impossible to exert high bending or shear loads on the ceramic member 14 as a result of misalignment and because of this the ceramic material is particularly well suited to this application.

FIGS. 3 and 4 show inner members for bearing similar to the bearing 12 but utilizing slightly different forms of lining means. In FIG. 3 the ceramic inner bearing member is shown at 35 and the lining means comprises a layer of metallic material 36 which is deposited directly onto the surface of the bore of the member and onto the end faces located at opposite ends of the bore. Various different metals may be used for such a deposited liner and for example the metal may be a nickel-titanium alloy or a molybdenum-manganese alloy.

In addition to metallic lining materials the lining means may be comprised of a plastic material as shown in FIG. 4. In this figure the ceramic inner bearing member is indicated at 38 and the lining means comprises a tubular plastic sleeve 40 bonded to the bore of the member 38 and two plastic washers 42, 42 bonded to the end faces of the member 38 on opposite sides of the bore.

We claim:
1. A self-lubricating bearing assembly comprising two bearing members having coengaging surfaces which are movable relative to one another, the surface of the first of said members being made from a compacted blend of amorphous carbon and graphite impregnated with a metal and the surface of the second of said members being provided by a body of polycrystalline aluminum oxide having an average grain size of 45 microns or finer and a density of at least 3.80 grams per cubic centimeter, said body being made from at least 99 weight percent polycrystalline aluminum oxide.

2. A bearing as defined in claim 1 wherein said metal is silver.

3. A self-lubricating bearing assembly comprising two bearing members having coengaging surfaces which are movable relative to one another, the surface of the first of said members comprising a carbonaceous material and the surface of the second of said members being provided by a body of polycrystalline aluminum oxide having an average grain size of 45 microns or finer, and a density of at least 3.80 grams per cubic centimeter, said body being made from at least 99 weight percent polycrystalline aluminum oxide, said first member being annular in shape and having an annular internal bearing surface, said second member being located within said first member and having an external annular bearing surface engageable with said internal surface of said first member, said second member having a bore extending therethrough and having an end face at each end of said bore arranged generally perpendicular to the axis thereof so as to define an annular corner at each end of said bore, and lining means fixed relative to said second member to prevent the application of a high concentrated load to a point on said second member near one of said corners, said lining means at each corner comprising an annular layer of material softer than that of said second member located adjacent the surface of said bore and extending some distance axially therealong and another layer of material softer than that of said second member located adjacent the associated end face of said second member and extending some distance radially therealong.

4. A bearing as defined in claim 3 further characterized by said internal bearing surface of said first member and said external bearing surface of said second member being spherical in shape so that said second member is retained by said first member for movement in a universal manner relative thereto.

5. A bearing as defined in claim 3 further characterized by said internal bearing surface of said first member and said external bearing surface of said second member being spherical in shape so that said second member is retained by said first member for movement in an oscillatory manner relative thereto.

6. A bearing comprising a first member made at least in part of carbonaceous material and being of an annular shape with an annular internal bearing surface, a second member made of a ceramic material located within said first member and having an annular external bearing surface engageable with said internal surface of said first member, said second member having a bore extending therethrough and having an end face at each end of said bore arranged generally perpendicular to the axis thereof so as to define an annular corner at each end of said bore, and lining means fixed relative to said second member to prevent the application of a high concentrated load to a point on said second member near one of said corners, said lining means comprising (1) a cylindrical bushing inserted in said bore and extending some distance axially therealong and being formed of a material softer than that of said second member and (2) two separate washers bonded respectively to each of said end faces and extending some distance radially therealong and being formed of a material softer than that of said second member.

7. A bearing as defined in claim 3 further characterized by said lining means comprising two metallic inserts respectively received in opposite end portions of said bore, each of said inserts including a tubular sleeve portion extending into said bore and an annular flange portion located adjacent the associated end face of said second member.

8. A bearing as defined in claim 3 further characterized by said lining means comprising a layer of metal deposited directly onto the surface of said bore and onto said end faces.

9. A bearing comprising a first member made at least in part of carbonaceous material and being of an annular shape with an annular internal bearing surface, a second member made of a ceramic material located within said first member and having an annular external bearing surface engageable with said internal surface of said first member, said second member having a bore extending therethrough and having an end face at each end of said bore arranged generally perpendicular to the axis thereof so as to define an annular corner at each end of said bore, and lining means fixed relative to said second member to prevent the application of a high concentrated load to a point on said second member near one of said corners, said lining means comprising two metallic inserts respectively received in opposite end portions of said bore and being formed of a material softer than that of said second member, each of said inserts including a tubular sleeve portion extending into said bore, and an annular flange portion located adjacent the associated end face of said second member, the inner ends of said sleeve portions being separated by an axial gap so that a compressive force applied between the annular flange portions of said two inserts is transferred through said second member, said sleeve portions of said two inserts having an external diameter slightly less than the external diameter of said bore in said second member and being bonded to said second member by a bonding agent.

References Cited

UNITED STATES PATENTS

| | | | |
|---|---|---|---|
| 1,694,438 | 12/1928 | Chinn | 308—72 |
| 2,319,240 | 5/1943 | Larsen. | |
| 2,365,552 | 12/1944 | Hill | 308—72 |
| 2,482,205 | 9/1949 | Potts | 308—238 |
| 2,629,161 | 2/1953 | Kistler | 308—238 X |
| 2,648,573 | 8/1953 | Wheildon. | |
| 2,733,968 | 2/1956 | Pelz | 308—238 X |
| 2,745,437 | 4/1956 | Comstock | 308—238 X |
| 3,020,101 | 2/1962 | McCaslin | 308—72 |
| 3,022,685 | 2/1962 | Armacost | 308—238 X |
| 3,284,144 | 11/1966 | Moore | 308—238 X |

FOREIGN PATENTS 187,756   1/1956   Austria.

EDGAR W. GEOGHEGAN, *Primary Examiner,*

L. L. JOHNSON, *Assistant Examiner.*

U.S. Cl. X.R.
308—72, 237, 238, 240